United States Patent
Bartl

(10) Patent No.: US 10,323,362 B2
(45) Date of Patent: Jun. 18, 2019

(54) VIBRATION EXCITER FOR SOIL COMPACTING DEVICES

(71) Applicant: Wacker Neuson Produktion GmbH & Co. KG, Munich (DE)

(72) Inventor: Andreas Bartl, Worth (DE)

(73) Assignee: Wacker Neuson Produktion GmbH & Co. KG, Munich (DE)

( * ) Notice: Subject to any disclaimer, the term of this patent is extended or adjusted under 35 U.S.C. 154(b) by 484 days.

(21) Appl. No.: 14/655,451

(22) PCT Filed: Nov. 18, 2013

(86) PCT No.: PCT/EP2013/003471
§ 371 (c)(1),
(2) Date: Jun. 25, 2015

(87) PCT Pub. No.: WO2014/101977
PCT Pub. Date: Jul. 3, 2014

(65) Prior Publication Data
US 2015/0376845 A1 Dec. 31, 2015

(30) Foreign Application Priority Data
Dec. 27, 2012 (DE) .................. 10 2012 025 378

(51) Int. Cl.
*B06B 1/16* (2006.01)
*E01C 19/28* (2006.01)
(Continued)

(52) U.S. Cl.
CPC ............ *E01C 19/286* (2013.01); *B06B 1/166* (2013.01); *E01C 19/38* (2013.01); *E02D 3/074* (2013.01); *H02K 7/061* (2013.01)

(58) Field of Classification Search
CPC ....... B06B 1/166; E01C 19/38; E01C 19/286; E02D 3/074; Y10T 74/18344; Y10T 74/18552; H02K 7/061
See application file for complete search history.

(56) References Cited

U.S. PATENT DOCUMENTS 3,875,811 A * 4/1975 Fuller .................... B06B 1/166
74/61
4,356,736 A * 11/1982 Riedl ..................... B06B 1/166
60/533
(Continued)

FOREIGN PATENT DOCUMENTS

DE 699 00 009 T2 5/2001
DE 100 38 206 A1 2/2002
(Continued)

OTHER PUBLICATIONS

U.S. Appl. No. 14/655,469, filed Jun. 25, 2015.

*Primary Examiner* — Andrew M Tecco
(74) *Attorney, Agent, or Firm* — Boyle Fredrickson, S.C.

(57) ABSTRACT

A vibration exciter for a soil compacting device includes a first unbalanced shaft on which at least one first unbalanced mass is arranged, a second unbalanced shaft which is arranged axially parallel to the first unbalanced shaft, which is contra-directionally rotatably coupled to the first unbalanced shaft in form-locked manner, and on which at least one second unbalanced mass is arranged, and a drive device for rotatably driving one of the unbalanced shafts and a rotation device. The drive device can be actuated by an actuation device in order to rotate the second unbalanced mass relative to the first unbalanced mass. The second unbalanced shaft has a cavity, and the actuation device is at least partially arranged inside the cavity.

8 Claims, 1 Drawing Sheet

(51) Int. Cl.
    *E01C 19/38*       (2006.01)
    *H02K 7/06*        (2006.01)
    *E02D 3/074*      (2006.01)

(56) References Cited

U.S. PATENT DOCUMENTS

| | | | | |
|---|---|---|---|---|
| 5,010,778 | A * | 4/1991 | Riedl | B06B 1/164 |
| | | | | 366/128 |
| 5,818,135 | A * | 10/1998 | Riedl | B06B 1/166 |
| | | | | 173/49 |
| 7,117,758 | B2 * | 10/2006 | Riedl | B06B 1/162 |
| | | | | 173/49 |
| 7,165,469 | B2 * | 1/2007 | Niemi | B06B 1/166 |
| | | | | 404/133.05 |
| 7,171,866 | B2 * | 2/2007 | Fervers | B06B 1/162 |
| | | | | 74/61 |
| 7,270,025 | B2 * | 9/2007 | Niglov | B06B 1/166 |
| | | | | 74/61 |
| 7,302,871 | B2 * | 12/2007 | Laugwitz | B06B 1/16 |
| | | | | 172/41 |
| 7,520,963 | B2 * | 4/2009 | Honkanen | D21F 1/20 |
| | | | | 162/256 |

FOREIGN PATENT DOCUMENTS

| | | | | |
|---|---|---|---|---|
| DE | 101 05 687 | A1 | 10/2002 | |
| DE | 10105687 | A1 * | 10/2002 | ............. B06B 1/166 |
| DE | 10 2004 028 715 | B3 | 2/2006 | |
| DE | 20 2006 004 707 | U1 | 6/2006 | |

* cited by examiner

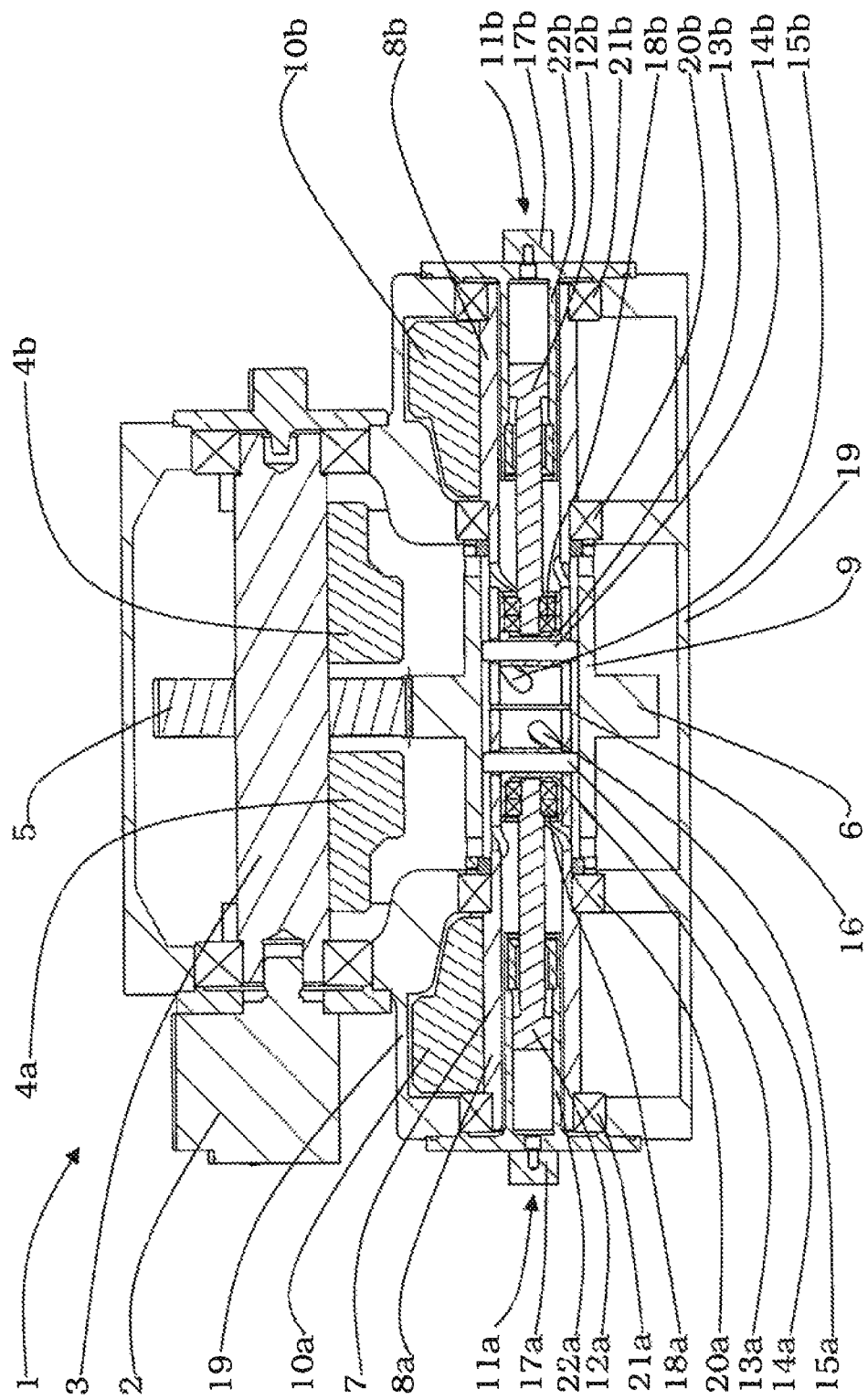

ized ground compaction devices or vibratory plates have long been known.

VIBRATION EXCITER FOR SOIL COMPACTING DEVICES

BACKGROUND OF THE INVENTION

1. Field of the Invention

The invention relates to a vibration exciter for a ground compaction device.

2. Discussion of the Related Art

Steerable ground compaction devices or vibratory plates for use in the construction industry have long been known. For example, G 78 18 542.9 and DE 101 05 687 A1 present steerable ground compaction devices wherein a vibration exciter is arranged in a housing on a ground contact plate.

SUMMARY OF THE INVENTION

The presented vibration exciters have two imbalance shafts which are coupled so as to be rotatable in opposite directions and which have imbalance masses formed thereon, the phase angle of which relative to one another is adjustable. By means of an adjustment of the phase angle, the direction of action of a resultant force vector generated by the rotating imbalance masses can be varied such that the ground compaction device moves in a forward or reverse direction.

Furthermore, on one of the imbalance shafts, two imbalance masses which are rotatable relative to the imbalance shaft are arranged with an axial offset to one another. The positions of each of the two imbalance masses with respect to the imbalance shaft that bears them are individually adjustable, such that, in interaction with the opposite, further imbalance shaft, resultant force vectors can be attained which generate a yaw moment about a vertical axis of the ground compaction device. In this way, a rotation of the ground compaction device, and thus steering, are made possible without the need for further external forces to be exerted, for example by an operator, on the ground compaction device.

The invention is based on the object of specifying a vibration exciter which, while being of compact and simultaneously robust design, achieves a high level of rotational dynamics and thus improves the traveling behavior of the ground compaction device.

The object is achieved by providing a vibration exciter for a ground compaction device that has a first imbalance shaft on which at least one first imbalance mass is arranged, a second imbalance shaft which is arranged axially parallel to the first imbalance shaft and which is coupled to the first imbalance shaft in positively locking fashion so as to rotate in the opposite direction and on which at least one second imbalance mass is arranged, a drive device for driving one of the imbalance shafts in rotation, and a relative-rotation device which can be actuated by way of an actuation device and which serves for rotating the second imbalance mass relative to the first imbalance mass. The second imbalance shaft has at least one cavity, and the actuation device is arranged at least partially within the cavity.

The first imbalance shaft and the second imbalance shaft may be arranged within a housing, wherein the housing is coupled to a ground contact plate of the ground compaction device. The electric motor or combustion engine may be situated on the upper structure, for example not directly on the housing (exciter housing). Power may be transmitted by way of a belt or hydraulically. The drive device, for example an electric motor or combustion engine, may be arranged on and/or in the housing and be coupled to the driven imbalance shaft, for example by means of a shaft and/or a belt apparatus. The drive device may for example be coupled to the first imbalance shaft.

Owing to the positively locking coupling for opposite rotation, the drive device can set the first and second imbalance shafts, and the imbalance masses formed thereon, in opposing rotational motion. In this way, a working movement of the ground contact plate can be generated by way of a resultant force vector of the centrifugal forces acting on the imbalance masses.

The relative-rotation device makes it possible, for example, for the imbalance mass arranged on the second imbalance shaft to be rotated relative to the imbalance mass arranged on the first imbalance shaft. In this way, the phase angle of the second imbalance mass relative to the imbalance mass arranged on the first imbalance shaft is varied such that the resultant force vector causes a forward or reverse movement and a vibratory movement when at a standstill.

Furthermore, a third imbalance mass may be arranged on the second imbalance shaft. In this case, the relative-rotation device makes it possible, for example, for at least one of the imbalance masses arranged on the second imbalance shaft to be individually rotated relative to the respective other of the imbalance masses arranged on the second imbalance shaft. During the opposite rotation of the two imbalance shafts that can be generated by way of the drive device, it is possible by means of the relative rotation of the imbalance masses arranged on the second imbalance shaft with respect to one another to generate, in accordance with the resultant force vector of the centrifugal forces acting on the imbalance masses, a yaw moment which permits a rotation of the ground compaction device about its vertical axis (which is substantially perpendicular to the surface of the ground), and thus also steering of the working movement.

Furthermore, in addition to the relative-rotation device, there may correspondingly also be provided a further relative-rotation device, for example for rotating the third imbalance mass relative to the second imbalance mass. This mirror-symmetrical design of the vibration exciter or of the ground compaction device, for example, permits balanced, bilateral steering and traveling behavior.

The relative rotation may be performed for example in response to an operator command while the ground compaction device is at a standstill and/or during the working operation of the ground compaction device. This makes it possible for the operator to control the yaw moment and thus the movement direction of the ground compaction device, for example by actuating an operation device of the ground compaction device or by actuating an operation device on a remote controller of the ground compaction device.

At least parts of the relative-rotation device, such as for example the actuation device, which may have a piston/cylinder unit, may be arranged within the cavity of the second imbalance shaft. For example, the second imbalance shaft may be at least partially in the form of a hollow shaft, in which the relative-rotation device or parts of the relative-rotation device, such as for example the control slide and/or the actuation device or the piston/cylinder unit, may be arranged.

This arrangement of parts of the relative-rotation device within the second imbalance shaft makes it possible for structural space to be saved, in particular in the regions to the sides of the second imbalance shaft. By contrast to the prior art, it is no longer necessary for structural space for the arrangement of relative-rotation devices to be provided laterally adjacent to the second imbalance shaft. Consequently, the second imbalance shaft can be of wide design, and may extend for example over virtually the entire width of the vibration exciter. On the second imbalance shaft which is of wide design, the first and second imbalance masses can be arranged with a large spacing to a central plane or plane of symmetry, which is perpendicular to the ground contact plate, of the ground compaction device. In this way, it is possible to realize a long lever arm of the centrifugal forces generated by the rotating second and third imbalance masses, and thus a high yaw rate.

Furthermore, in the case of an arrangement of said type, it is possible for the overall dimensions of the vibration exciter to be made small, and for the ground compaction device to be of compact design.

In one embodiment, an orbit of the second imbalance mass and/or of the third imbalance mass about the second imbalance shaft at least partially surrounds the cavity, the actuation device, a piston of the piston/cylinder unit and/or a cylinder of the piston/cylinder unit.

For example, it is possible for the imbalance masses formed on the second imbalance shaft to be arranged at the outside on the second imbalance shaft, for example at as great a distance as possible from the central plane of symmetry of the ground compaction device. In particular, it is possible for the second and/or third imbalance mass(es) to be arranged far to the outside, close to a wall of the housing, as no separate structural space needs to be provided laterally adjacent to the second imbalance shaft for the arrangement of the relative-rotation device, which is for example received entirely in the respective imbalance shaft halves. In this way, the possible rate of rotation or yaw rate can be further increased.

In a further embodiment, at least a part of the relative-rotation device and/or the actuation device or the piston/cylinder unit can be decoupled from a rotation of the second imbalance shaft by way of a rotation decoupling device.

The rotation decoupling device may for example have a bearing device or a bearing such as, for example, a ball bearing, wherein the bearing device serves, for example, to rotationally decouple the piston/cylinder unit, which is at least partially arranged in the cavity, at least from parts of the second imbalance shaft. This makes it possible to prevent interaction between the rotating second imbalance shaft and the one or more relative-rotation devices.

In a further embodiment, the second imbalance shaft has a first imbalance shaft half, which bears the second imbalance mass, and a second imbalance shaft half, which is arranged coaxially with respect to the first imbalance shaft half and which is rotatable relative to the first imbalance shaft half and which bears a third imbalance mass. The first imbalance shaft half can be rotated relative to the second imbalance shaft half by the relative-rotation device.

Since, in this embodiment, the second imbalance shaft half is split and the two imbalance shaft halves are rotatable relative to one another, the respective imbalance masses may be formed or fastened directly on the respective imbalance shaft halves. The relative rotatability of the two imbalance masses arranged on the second imbalance shaft with respect to one another is achieved by way of the relative rotatability of the imbalance shaft halves with respect to one another.

By contrast to the prior art, it is consequently not necessary for the imbalance masses arranged on the second imbalance shaft to be arranged so as to be relatively rotatable with respect to the second imbalance shaft. In the prior art, this is achieved for example by virtue of the imbalance masses being arranged on adjustment sleeves which are rotatable relative to the imbalance shaft.

By means of the splitting of the second imbalance shaft, a robust and inexpensive design of the second imbalance shaft is consequently realized.

Furthermore, the respective relative-rotation devices may be arranged in cavities of the two imbalance shaft halves. The relative-rotation devices can, in this arrangement, rotate the imbalance shaft halves relative to one another and act for example in a coupling region, in which the imbalance shaft halves are coupled to one another for example at the face side. The imbalance shaft halves may be in the form of at least partially hollow shaft halves or shaft stubs which receive the respective relative-rotation devices.

In a variant of this embodiment, a coupling device is provided for coupling the first imbalance shaft half and the second imbalance shaft half in positively locking fashion and so as to be rotatable relative to one another.

The coupling device permits positively locking coupling of the two imbalance shaft halves and thus common rotational behavior of the two imbalance shaft halves as a second imbalance shaft. The relative rotatability of the coupling makes it possible for the imbalance masses formed on the two imbalance shaft halves to be rotated individually and relative to one another about the axis of rotation, and thus set in rotation with a shifted phase angle with respect to one another, which permits the generation of the yaw moment and thus the steering of the ground compaction device during working operation.

In a further embodiment, the first imbalance shaft and the second imbalance shaft can be coupled to one another by way of the coupling device in positively locking fashion and for rotatability in opposite directions.

In this embodiment, the coupling device can couple the first imbalance shaft, the first imbalance shaft half and the second imbalance shaft half to one another in positively locking fashion in each case. The coupling device thus couples firstly the first and second imbalance shaft halves, which owing to this coupling form the second imbalance shaft. The second imbalance shaft can likewise be coupled by means of the coupling device to the first imbalance shaft in positively locking fashion and for rotatability in opposite directions. Consequently, the coupling device couples the shafts or shaft halves, which bear the imbalance masses, in positively locking fashion, and thus ensures uniform traveling behavior in accordance with an operator demand.

In one embodiment, the relative-rotation device has a control slide, which can be displaced by the actuation device or the piston/cylinder unit, and an engagement element, which is arranged on the first imbalance shaft half and which can be displaced axially with respect to the first imbalance shaft half by the control slide and which serves for engaging in positively locking fashion into a recess of the coupling device and for engaging in positively locking fashion into a recess of the first imbalance shaft half. At least one of the recesses has a groove which runs helically at least in sections.

In this embodiment, the engagement element produces the positively locking coupling between the first imbalance shaft half and the coupling device. Said engagement element can be displaced by the control slide and, in the process, can perform a movement with at least a movement component directed axially along the axis of rotation of the first imbalance shaft half. Said engagement element, at one side, engages in positively locking fashion into a recess of the first imbalance shaft half, for example into a groove in the first imbalance shaft half, which is in the form of a hollow shaft. At the other side, the engagement element engages in positively locking fashion into a recess of the coupling device and/or of the sleeve device, for example into a groove formed into the sleeve device. Owing to the helical profile, at least in sections, of at least one of the recesses or grooves, it is the case during a displacement of the engagement element that the first imbalance shaft half rotates relative to the coupling device or sleeve device. When the control slide is at a standstill relative to the first imbalance shaft half, the engagement element remains in engagement both with the first imbalance shaft half and with the sleeve device, and thus produces the positively locking coupling which ensures the common rotation of imbalance shaft half and coupling device.

In a variant of this embodiment, the vibration exciter has a further relative-rotation device for rotating the second imbalance mass and/or the third imbalance mass relative to another of the imbalance masses, wherein the further relative-rotation device is arranged on the second imbalance shaft so as to be situated opposite the relative-rotation device. The further relative-rotation device has a further control slide, which can be displaced by a further actuation device or by a further piston/cylinder unit, and a further engagement element, which is arranged on the second imbalance shaft half and which can be displaced axially with respect to the second imbalance shaft half by the further control slide and which serves for engaging in positively locking fashion into a recess of the coupling device and for engaging in positively locking fashion into a further recess of the second imbalance shaft half. At least one of the recesses has a groove which runs helically at least in sections.

The further relative-rotation device makes it possible to realize a mirror-symmetrical design of the vibration exciter and ensures the relative rotatability of the second imbalance shaft half with respect to the coupling device.

In a further variant, the coupling device may have a sleeve device for receiving at least a part of the first imbalance shaft half and/or of the second imbalance shaft half.

The sleeve device facilitates the positively locking coupling of the first and second imbalance shaft halves to the coupling device for example by way of the respective imbalance shaft half being inserted axially into the sleeve device, such that the sleeve extends in each case over a shaft end of the first and second imbalance shaft halves. It also facilitates the coaxial arrangement with, for example, imbalance shaft halves situated oppositely at the face sides. Furthermore, substantially cylindrical recesses of the sleeve device, for example, permit the relative rotatability of the imbalance shaft halves with respect to the coupling device and/or with respect to one another.

In a further variant of this embodiment, the sleeve device has, on its outer side, a gearwheel device for engaging into a further gearwheel device which is coupled to the first imbalance shaft.

In this embodiment, the coupling device, for example in the form of a sleeve into both sides of which the respective imbalance shaft half can be coupled in positively locking fashion but so as to be rotatable relative to the sleeve, may be formed with an encircling gearwheel affixed to the sleeve. The two gearwheel devices may for example engage directly into one another in meshing fashion and thus ensure the positively locking coupling of the two imbalance shafts for rotatability in opposite directions.

In a further embodiment, the actuation device has a piston/cylinder unit. Alternatively, the actuation device may also have a mechanical or electromechanical adjustment mechanism.

In a variant of this embodiment, the piston/cylinder unit may be hydraulically operable, and a feed for hydraulic fluid to the piston/cylinder unit may be arranged on an axial face side of the second imbalance shaft.

In a further variant, it may be provided that a first bearing device, which serves for the mounting of the second imbalance shaft, is arranged axially between the second imbalance mass and the coupling device, a second bearing device, which serves for the mounting of the second imbalance shaft, is arranged axially between the third imbalance mass and the coupling device, a third bearing device, which serves for the mounting of the second imbalance shaft, is arranged at a side of the second imbalance mass facing away from the coupling device, and/or a fourth bearing device, which serves for the mounting of the second imbalance shaft, is arranged at a side of the third imbalance mass facing away from the coupling device.

In this embodiment, the first and the second bearing device may form an inner bearing pair. The third and fourth bearing device may form an outer bearing pair. All of the bearing devices may for example have a ball bearing and support the second imbalance shaft with respect to the housing of the vibration exciter.

Owing to the arrangement of the first and/or second bearing device axially between the imbalance mass and the coupling device or the sleeve device, and the arrangement of the third and/or fourth bearing device at that side of the imbalance mass which faces away from the coupling device, elastic axial deformations introduced into the first imbalance shaft half by the rotating imbalance mass are lessened and are substantially isolated from the coupling device. Bending of the second imbalance shaft is prevented.

Consequently, the first gearwheel device, which is arranged on the coupling device, is subjected to vibrations of significantly lower intensity and a smaller axial offset, such that the positively locking coupling of the imbalance shafts at the gearwheel pairing is relieved of load. The gearwheel pairing provided for the coupling of the two imbalance shafts consequently runs more quietly, and a longer service life is facilitated.

These and further features of the invention will be discussed in more detail below on the basis of an example and with reference to the appended FIGURE, in which:

BRIEF DESCRIPTION OF THE DRAWING

FIG. 1 shows a section of a vibration exciter according to the invention in a plan view.

DETAILED DESCRIPTION

The FIGURE schematically shows an embodiment of a vibration exciter 1 in a view from above in a section in a plane running substantially parallel to the surface of the ground to be processed. The vibration exciter 1 may be used in particular in a vibratory plate foreground compaction.

The vibration exciter 1 has a first imbalance shaft 3 which is driven in rotation by a drive device 2 and which has imbalance masses 4a and 4b arranged or fastened thereon. By means of two gearwheels 5 and 6, the rotational movement of the first imbalance shaft 3 is transmitted in positively locking fashion to a second imbalance shaft 7 such that the latter rotates in the opposite direction.

The second imbalance shaft 7 has a first imbalance shaft half 8a and a second imbalance shaft half 8b which is arranged coaxially with respect to the first imbalance shaft half 8a and which is rotatable relative to the first imbalance shaft half. The two imbalance shaft halves 8*a* and 8*b* are inserted into both sides of an adjustment sleeve 9 which belongs to a coupling device and which couples the two imbalance shaft halves 8*a* and 8*b* in positively locking fashion but such that they are rotatable relative to one another. The gearwheel 6 is arranged in encircling fashion on the adjustment sleeve 9. The adjustment sleeve 9 consequently forms, with the gearwheel 6, a coupling device for the positively locking coupling of the first imbalance shaft 3 to the second imbalance shaft 7, which is composed of the two imbalance shaft halves 8*a*, 8*b*.

Adjustable imbalances 10*a* and 10*b* are arranged or fastened on the two imbalance shaft halves 8*a* and 8*b*. To realize an individual relative rotation of the adjustable imbalances 10*a*, 10*b* about the axis of rotation of the second imbalance shaft 7, respective relative-rotation devices 11*a*, 11*b* are provided and are recessed into the imbalance shaft halves 8*a* and 8*b*, which are in the form of hollow shafts.

By means of the relative-rotation devices 11*a*, 11*b*, the phase angle of the adjustable imbalances 10*a*, 10*b* relative to the imbalance masses 4*a*, 4*b* arranged on the first imbalance shaft 3 can be adjusted. By means of the centrifugal force vectors that act on the imbalance masses 4*a*, 4*b*, 10*a*, 10*b* during a rotation of the imbalance masses 4*a*, 4*b* and 10*a*, 10*b* in each case about the oppositely rotating imbalance shafts 3, 7, it is possible, with a shifted phase angle, to realize a forward or reverse movement of the ground compaction device that is operated by way of the vibration exciter 1. By means of a relative rotation of the adjustable imbalances 10*a*, 10*b* with respect to one another, a yaw moment and thus a rotation of the ground compaction device is generated about a vertical axis of the vibration exciter 1 or of the ground compaction device, said vertical axis projecting vertically out of the plane of the drawing.

Below, only the relative-rotation device 11*a* will be discussed. The relative-rotation device 11*b* is of identical construction and, in the FIGURE, is illustrated mirror-symmetrically with respect to the relative-rotation device 11*a*.

The relative-rotation device 11*a* has a hydraulically operable actuation device with a piston 12*a* arranged in a cover sleeve, the latter being arranged or fastened on a housing 19 of the vibration exciter 1 and engaging into the imbalance shaft half 8*a*. Part of the cover sleeve is formed by a cylinder 22*a* in which the piston 12*a* is mounted in axially movable fashion. The cover sleeve, the cylinder 22*a* and the piston 12*a* are rotationally decoupled from the imbalance shaft half 8*a* by way of bearing 18*a* and are fastened to the housing 19 of the vibration exciter 1.

The piston 12*a* can axially displace a slide 13*a* within the imbalance shaft half 8*a*. The slide 13*a* bears a transverse pin 14*a* which extends through a helical groove 15*a* provided in a wall of the first imbalance shaft half 8*a*, which is in the form of a hollow shaft. At the same time, the transverse pin 14*a* engages into a longitudinal groove 16 which is formed on the inner side of the adjustment sleeve 9 and which lies radially outside or above the helical groove 15*a*. Owing to the helical profile of the groove 15*a*, the axial displacement of the slide 13*a* with the transverse pin 14*a* has the effect of forcibly imparting to the first imbalance shaft half 8*a* a rotational movement relative to the adjustment sleeve 9. In this way, the relative rotational position of the adjustable imbalance 10*a* relative to the adjustment sleeve 9, relative to the adjustable imbalance 10*b* and relative to the first imbalance shaft 3 is varied.

The helical groove 15*a* forms a recess of the first imbalance shaft half 8*a* and is preferably arranged in a region of the first imbalance shaft half 8*a* which faces toward the central axis of symmetry of the housing 19 (exciter housing) and/or of the ground compaction device. The recess is preferably arranged in a half of the first imbalance shaft half 8*a*, and/or the recess extends over at most a half of the length of the first imbalance shaft half 8*a*, which half faces toward the central axis of symmetry. The recess is particularly preferably arranged in a third of the first imbalance shaft half 8*a*, and/or the recess extends over at most a third of the length of the first imbalance shaft half 8*a*, which third faces toward the central axis of symmetry.

During working operation, the adjustable imbalances 10*a* and 10*b* seek, owing to their inertia, to change their respective phase angle in a retarding direction, and thus push the pistons 12*a* and 12*b* back into their initial positions. To further assist the return movement of the pistons 12*a*, 12*b*, spring devices may be provided, and arranged for example within the cylinders 22*a*, 22*b*. The spring devices can support the pistons 12*a*, 12*b* for example against a face side, facing toward the adjustment sleeve 9, of the respective cylinder 22*a*, 22*b*.

In this arrangement, the relative-rotation device 11*a* is almost entirely recessed into a cavity of the first imbalance shaft half 8*a*. Only an inlet 17*a* for hydraulic fluid for the movement or exertion of pressure on the piston 12*a* projects out of the first imbalance shaft half 8*a*. The piston 12*a*, at least in a maximally retracted position, is entirely received in the second imbalance shaft 7 and/or recessed into the first imbalance shaft half 8*a*. The piston 12*a*, the cylinder 22*a* and the inlet 17*a* are in this case decoupled from a rotational movement of the first imbalance shaft half 8*a* and of the slide 13*a* by way of a bearing 18*a*, which serves as a rotational decoupling means.

Furthermore, it may be the case that the end region of the piston 12*a*, even in a maximally deployed position, that is to say remote from the central axis of symmetry of the housing 19, is received entirely in the second imbalance shaft 7 and/or does not project out of the contour formed by the housing 19 (exciter housing). The exciter housing is to be understood to mean the housing 19 without further fixtures, which housing serves for receiving the shafts 3, 7 and imbalance masses 4*a*, 4*b*, 10*a*, 10*b*.

In this arrangement, an orbit of the adjustable imbalance 10*a* about the first imbalance shaft half 8*a* may at least partially or even entirely surround the cavity, the piston 12*a* and/or the cylinder 22*a*. This makes it possible for the adjustable imbalance 10*a* to be arranged far to the outside on the first imbalance shaft half 8*a*, that is to say with a large spacing to an axis of symmetry, running through the gearwheels 5, 6, of the vibration exciter 1, and for example directly adjacent to a housing 19 of the vibration exciter 1. Consequently, during the rotation of the adjustable imbalance 10*a*, a large lever arm acts, which can yield a high rate of rotation of the ground compaction device about the vertical axis.

Good controllability of the ground compaction device can be attained in particular if, as shown in the FIGURE, the second and third imbalance masses 10*a*, 10*b* (adjustable imbalances 10*a*, 10*b*) are arranged far remote from the central plane of the exciter. In this way, it can be achieved that the imbalance masses 4*a*, 4*b* and the second and third imbalance masses 10*a*, 10*b* (adjustable imbalances 10*a*, 10*b*) are arranged axially offset with respect to one another such that there is only a small overlap, or no overlap, between the imbalance masses 4*a*, 4*b*, 10*a*, 10*b*. The overlap between an imbalance mass 4*a*, 4*b* of the first imbalance shaft 3 and an imbalance mass 10*a*, 10*b* (adjustable imbalance 10a, 10b) of the second imbalance shaft 7 is preferably at most 50 percent. To calculate this, the axial length of the overlap is set in a ratio with respect to the added-together total length of the two imbalance masses. The overlap is more preferably at most 25 percent. There is particularly preferably no overlap between the imbalance masses 4a, 4b, 10a, 10b.

An inner bearing 20a is arranged axially between the adjustable imbalance 10a and the adjustment sleeve 9, and a further inner bearing 20b is arranged between the adjustable imbalance 10b and the adjustment sleeve 9. The adjustment sleeve 9 with the gearwheel 6 is thus mounted between the adjacently arranged inner bearings 20a and 20b. Furthermore, the second imbalance shaft 7 is mounted on the housing 19 by way of outer bearings 21a, 21b. The outer bearings 21a, 21b may be arranged adjacent to or in the direct vicinity of the adjustable imbalances 10a, 10b.

Thus, the first imbalance shaft half 8a is mounted in the housing 19 by way of the bearings 20a and 21a, whereas the second imbalance shaft half 8b is mounted in the housing 19 by way of the bearings 20b and 21b. The adjustment sleeve 9 is positioned on, and supported by, the end regions of the first imbalance shaft half 8a and of the second imbalance shaft half 8b.

Elastic deformations of the second imbalance shaft 7, which are imparted to the latter by the rotating adjustable imbalances 10a and 10b, are lessened by the bearings 20a, 20b and 21a, 21b. The adjustment sleeve 9 with the gearwheel 6 arranged thereon is thus subjected to elastic displacement only to a small extent. Consequently, the gearwheel pairing 5, 6 runs relatively quietly, and is subjected to significantly lower mechanical load. Furthermore, the bearings 20a, 20b, 21a, 21b are arranged, with regard to the first and second imbalance shaft halves 8a, 8b, such that the loads imparted by the second and third imbalance masses 10a, 10b (adjustable imbalances 10a, 10b) are dissipated by the respectively adjacently arranged bearings, such that the region of the respective imbalance shaft half 8a, 8b in which the recess (helical groove 15a, 15b) is arranged is isolated from the load.

Owing to the splitting of the second imbalance shaft 7 into the two imbalance shaft halves 8a and 8b, it is possible in the embodiment shown in the FIGURE for the adjustable imbalances 10a and 10b to be arranged directly on the imbalance shaft halves 8a and 8b. The adjustment sleeve 9 is thus not subjected to load by the imbalances, but is spatially separate from the second and third imbalance masses 10a, 10b (adjustable imbalances 10a, 10b). Furthermore, in each case one bearing point is arranged between the adjustment sleeve 9 and the second and third imbalance masses 10a, 10b (adjustable imbalances 10a, 10b), such that the action of the imbalance masses (adjustable imbalances 10a, 10b) on the sleeve (adjustment sleeve 9), and on the adjustment arrangement 9, 13a, 13b, 14a, 14b, 15a, 15b as a whole, is minimized. This increases the robustness of the vibration exciter 1. In the exemplary embodiment shown, the torque flow runs from the drive device 2 via the first imbalance shaft 3, the gearwheel pairing 5, 6, the adjustment sleeve 9, the engagement elements (transverse pins) 14a, 14b, in each case to the first and second imbalance shaft halves 8a, 8b and in each case onward to the second and third imbalance masses 10a, 10b (adjustable imbalances 10a, 10b).

The relative rotatability of the adjustable imbalances 10a and 10b is in this case ensured by way of the centrally arranged adjustment sleeve 9. The adjustment sleeve 9 is in this case isolated from the weight of the adjustable imbalances 10a and 10b and is furthermore protected, by the inner bearings 20a and 20b, from the shaft bending caused by the rotating adjustable imbalances 10a, 10b. Consequently, quieter operation and an increased service life of the vibration exciter 1 can be expected.

Owing to the arrangement of the relative-rotation devices 11a, 11b within the imbalance shaft halves 8a, 8b formed as hollow shafts, the adjustable imbalances 10a and 10b can be arranged far to the outside on the second imbalance shaft 7 and thus with a large lever arm with respect to the vertical axis of the ground compaction device. This permits a high level of rotational dynamics and improved traveling behavior of the ground compaction device or vibratory plate in accordance with an operator demand. Traveling maneuvers can be realized more quickly, leading to greater productivity of the ground compaction device. This also applies in particular to remote-controlled vibratory plates of compact design.

I claim:

1. A vibration exciter for a ground compaction device, comprising:
    a first imbalance shaft on which at least one first imbalance mass is arranged,
    a second imbalance shaft which is arranged axially parallel to the first imbalance shaft and which is coupled to the first imbalance shaft in a positively locking fashion so as to rotate in the opposite direction as the first imbalance shaft and on which at least one second imbalance mass is arranged,
    an actuation device,
    a drive device configured to drive one of the imbalance shafts in rotation, and
    a relative-rotation device which is configured to be actuated by the actuation device and which is configured to rotate the second imbalance mass relative to the first imbalance mass, wherein
    the second imbalance shaft has at least one cavity, and wherein
    the actuation device is arranged at least partially within the cavity, wherein the second imbalance shaft has 1) a first imbalance shaft half which bears the second imbalance mass and 2) a second imbalance shaft half that is arranged coaxially with respect to the first imbalance shaft half, which is rotatable relative to the first imbalance shaft half, and which bears a third imbalance mass, and wherein the first imbalance shaft half is configured be rotated relative to the second imbalance shaft half by the relative-rotation device, further comprising
    a coupling device for coupling the first imbalance shaft half and the second imbalance shaft half together in a positively locking fashion and so as to be rotatable relative to one another, wherein the relative-rotation device has 1) a control slide which can be displaced by the actuation device and 2) an engagement element which is arranged on the first imbalance shaft half, which can be displaced axially with respect to the first imbalance shaft half by the control slide, and which is configured to engage in a positively locking fashion into both a recess of the coupling device and a recess of the first imbalance shaft half, wherein at least one of the recesses has a groove which runs helically at least in sections thereof, and further comprising
    a further relative-rotation device that is configured to rotate at least one of the second imbalance mass and the third imbalance mass relative to another of the imbalance masses, wherein the further relative-rotation device is arranged on the second imbalance shaft so as to be situated opposite the relative-rotation device, wherein the further relative-rotation device has a further control slide, which can be displaced by a further actuation device, and a further engagement element, which is arranged on the second imbalance shaft half and which can be displaced axially with respect to the second imbalance shaft half by the further control slide and which is configured to engage in a positively locking fashion into a recess of the coupling device and into a further recess of the second imbalance shaft half, and wherein at least one of the recesses has a groove which runs helically at least in sections thereof.

2. The vibration exciter as claimed in claim 1, wherein the coupling device has a sleeve device that is configured to receive at least a part of at least one of the first imbalance shaft half and the second imbalance shaft half.

3. The vibration exciter as claimed in claim 2, wherein the sleeve device has, on an outer side thereof, a gearwheel device that is configured to engage into a further gearwheel device which is coupled to the first imbalance shaft.

4. The vibration exciter as claimed in claim 1, wherein the actuation device has a piston/cylinder unit.

5. The vibration exciter as claimed in claim 4, wherein the piston/cylinder unit is hydraulically operable, and
a feed for hydraulic fluid to the piston/cylinder unit is arranged on an axial face side of the second imbalance shaft.

6. The vibration exciter as called in claim 1, wherein an overlap between an imbalance mass of the at least one first imbalance mass of the first imbalance shaft and an imbalance mass of the at least one second imbalance mass of the second imbalance shaft is, at most, 25 percent.

7. The vibration exciter as called for in claim 1, wherein there is no overlap between an imbalance mass of the at least one first imbalance mass of the first imbalance shaft and an imbalance mass of the at least one second imbalance mass of the second imbalance shaft.

8. The vibration exciter as called for in claim 1, wherein a position of at least one second imbalance masses is adjustable with respect to the second imbalance shaft, such that, during interaction with the first imbalance shaft, resultant force vectors generate a yaw moment about a vertical axis of the ground compaction device.

* * * * *